(12) United States Patent
Hasegawa (10) Patent No.: US 8,823,863 B2
(45) Date of Patent: Sep. 2, 2014

(54) IMAGE CAPTURING APPARATUS AND CONTROL METHOD THEREFOR

(71) Applicant: Canon Kabushiki Kaisha, Tokyo (JP)

(72) Inventor: Reiji Hasegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/856,630

(22) Filed: Apr. 4, 2013

(65) Prior Publication Data

US 2013/0265484 A1    Oct. 10, 2013

(30) Foreign Application Priority Data

Apr. 10, 2012    (JP) ................................ 2012-089674

(51) Int. Cl.
*G03B 13/00*    (2006.01)
*H04N 5/232*    (2006.01)

(52) U.S. Cl.
CPC ....... *H04N 5/23212* (2013.01); *H04N 5/23219* (2013.01)
USPC .......................... 348/345; 348/222.1; 382/209

(58) Field of Classification Search
USPC ................ 348/345, 222.1; 382/115, 190, 209
See application file for complete search history.

(56) References Cited

U.S. PATENT DOCUMENTS

| 7,747,159 B2* | 6/2010 | Uenishi ......................... 396/135 |
| 2010/0066843 A1* | 3/2010 | Muramatsu .............. 348/208.14 |

FOREIGN PATENT DOCUMENTS

JP    2010-092199 A    4/2010

\* cited by examiner

*Primary Examiner* — Paul Berardesca
(74) *Attorney, Agent, or Firm* — Carter, DeLuca, Farrell & Schmidt, LLP (57) ABSTRACT

An image capturing apparatus includes: a first detection unit that, based on feature amounts of an image obtained by an image sensor, detects a position of a certain subject in the image and a position of a certain part of the certain subject; and a second detection unit that detects a position of a region of the certain subject in the image obtained by the image sensor with a smaller calculation amount than the first detection unit. A focus detection area corresponding to the certain part is selected from among a plurality of focus detection areas based on a relationship between the position of the region of the certain subject detected by the second detection unit and the positions of the certain subject and the certain part detected by the first detection unit.

6 Claims, 7 Drawing Sheets

IMAGE CAPTURING APPARATUS AND CONTROL METHOD THEREFOR

BACKGROUND OF THE INVENTION

1. Field of the Invention

The present invention relates to an image capturing apparatus and a control method therefor, and in particular to an image capturing apparatus that has an autofocus function and a control method therefor.

2. Description of the Related Art

When capturing an image of a person, it is common to focus on the person's face, especially on the person's eyes. However, it is not easy to manually focus on the eyes. Although recent cameras have an autofocus function, they do not automatically focus on the eyes. Cameras need to detect the face and the eyes of a subject included in a field of view in order to automatically focus on the eyes.

One method for detecting the face and the eyes of a person from an image is to store a face region as a template image, and consider a region that has the highest correlation with the template image in an image to be searched as a corresponding face region (template matching). For example, a summation of differences between values of pixels in a partial image of the template image and values of corresponding pixels in a partial image of the image to be searched is obtained. This summation is performed repeatedly while changing the position at which the pair of partial images is cut out. A partial image at the position corresponding to the smallest summation is determined as a region that has the highest correlation with the template image.

On the other hand, Japanese Patent Laid-Open No. 2010-92199 suggests a method for detecting a person's face and eyes from an image using detectors that have acquired knowledge based on various feature amounts with the aid of boosting.

Template matching enables high-speed processing as it requires simple calculation. Template matching can be performed on each frame also when capturing a video and when performing continuous shooting. However, as the determination is performed based on the summation of differences between values of pixels, specific position information showing the positions of the eyes and the mouth in the searched partial image cannot be obtained.

On the other hand, although the method described in Japanese Patent Laid-Open No. 2010-92199 allows detecting the positions of the eyes and the mouth in the face, it requires an enormous amount of calculation to detect the face. Therefore, when this method is used in an ordinary image capturing apparatus with low processing capability, it is expected that the shutter response will slow down and this method cannot be used when taking a video and when performing continuous shooting.

As set forth above, with conventional technology, the face and the eyes in the face cannot be detected from a plurality of images captured at a short interval, such as video frames and frames captured through continuous shooting. Therefore, conventional technology does not allow automatic focusing on the face and the eyes at high speed. This problem of conventional technology is applicable to general autofocus control for both the face of a person and certain parts of a subject.

SUMMARY OF THE INVENTION

The present invention provides an image capturing apparatus that can at least alleviate the aforementioned problem of conventional technology and can automatically focus on certain parts of a subject at high speed, and a control method for such an image capturing apparatus.

According to an aspect of the present invention, there is provided an image capturing apparatus comprising: an image sensor; a first detection unit that, based on feature amounts of an image obtained by the image sensor, detects a position of a certain subject in the image and a position of a certain part of the certain subject; a second detection unit that detects a position of a region of the certain subject in the image obtained by the image sensor with a smaller calculation amount than the first detection unit; a selection unit that selects, from among a plurality of focus detection areas, a focus detection area to be focused on; and an autofocus unit that performs autofocus on the selected focus detection area, wherein the selection unit selects a focus detection area corresponding to the certain part based on a relationship between the position of the region of the certain subject detected by the second detection unit and the positions of the certain subject and the certain part detected by the first detection unit.

According to another aspect of the present invention, there is provided a control method for an image capturing apparatus, the image capturing apparatus comprising: an image sensor; a first detection unit that, based on feature amounts of an image obtained by the image sensor, detects a position of a certain subject in the image and a position of a certain part of the certain subject; and a second detection unit that detects a position of a region of the certain subject in the image obtained by the image sensor with a smaller calculation amount than the first detection unit, and the control method comprising: a selection step of selecting a focus detection area corresponding to the certain part from among a plurality of focus detection areas based on a relationship between the position of the region of the certain subject detected by the second detection unit and the positions of the certain subject and the certain part detected by the first detection unit; and an autofocus step of performing autofocus on the selected focus detection area.

Further features of the present invention will become apparent from the following description of exemplary embodiments with reference to the attached drawings.

DESCRIPTION OF THE EMBODIMENTS

An exemplary embodiment of the present invention will now be described in detail in accordance with the accompanying drawings.

Figure 1:
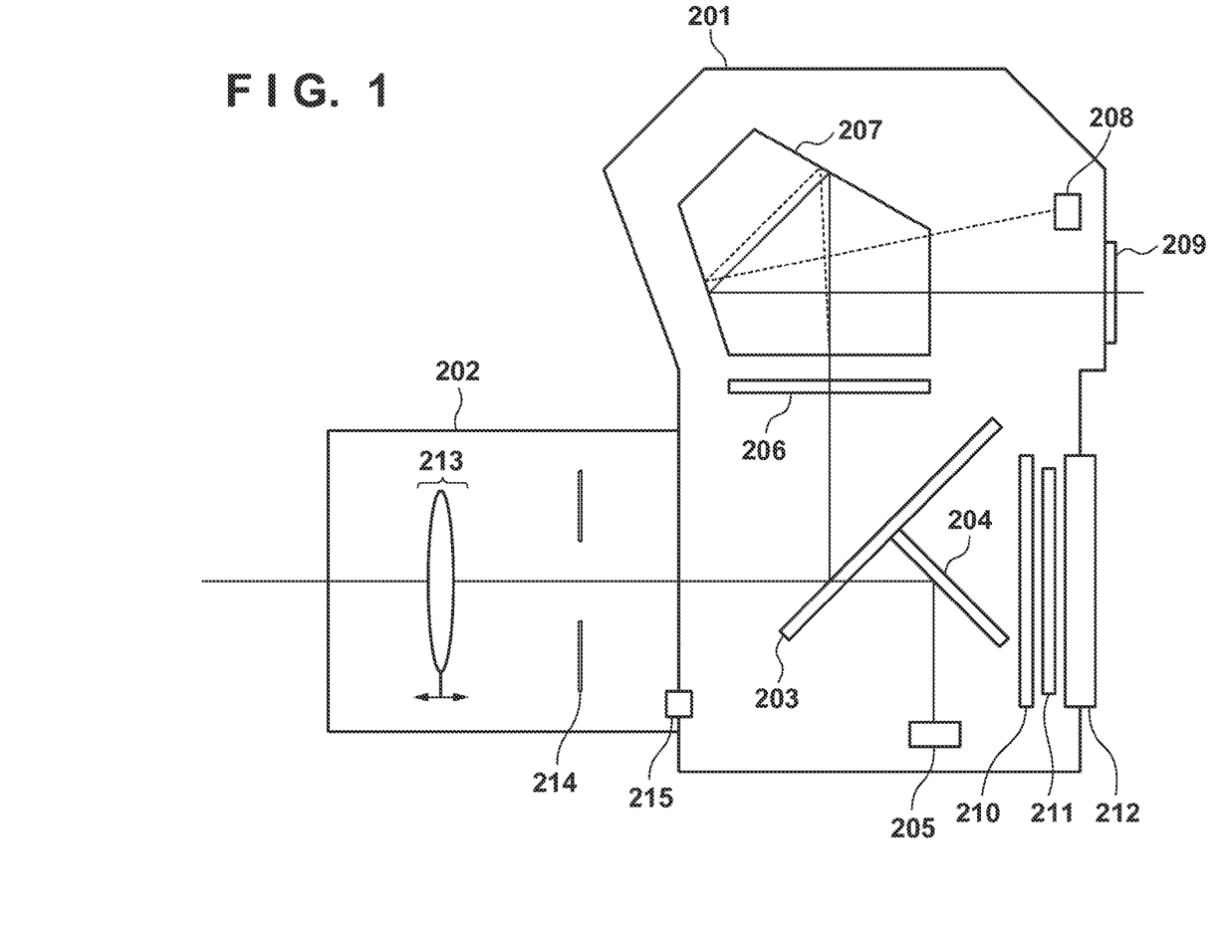
FIG. 1 is a side cross-sectional view of a digital single-lens reflex camera as one example of an image capturing apparatus according to an embodiment of the present invention.

FIG. 1 is a side cross-sectional view of a digital single-lens reflex camera (DSLR) as one example of an image capturing apparatus according to an embodiment of the present invention, illustrating an example of arrangement of major constituents of the DSLR. The DSLR includes a main body 201 and an imaging lens 202 attached to the front side of the main body 201. The imaging lens 202 is interchangeable. The main body 201 and the imaging lens 202 are mechanically and electrically connected via a lens mount, which is not shown in the figures. The imaging lens 202 is composed of a focusing lens 213 and a diaphragm 214, and operates in accordance with electrical control by the main body 201 via a group of lens mount contact points 215.

A main mirror 203 is a half mirror. A sub-mirror 204 is mounted on the back surface of the main mirror 203. When the main mirror 203 is not in a mirror lock-up state as shown in FIG. 1, a part of luminous flux from the imaging lens 202 is reflected and incident on a viewfinder optical system positioned above the main mirror 203, while transmitted light is reflected by the sub-mirror 204 and incident on an AF device 205 positioned below the main mirror 203. When the main mirror 203 is in a mirror lock-up state, e.g. at the time of exposure, the main mirror 203 is retracted from an optical path.

Figure 3:
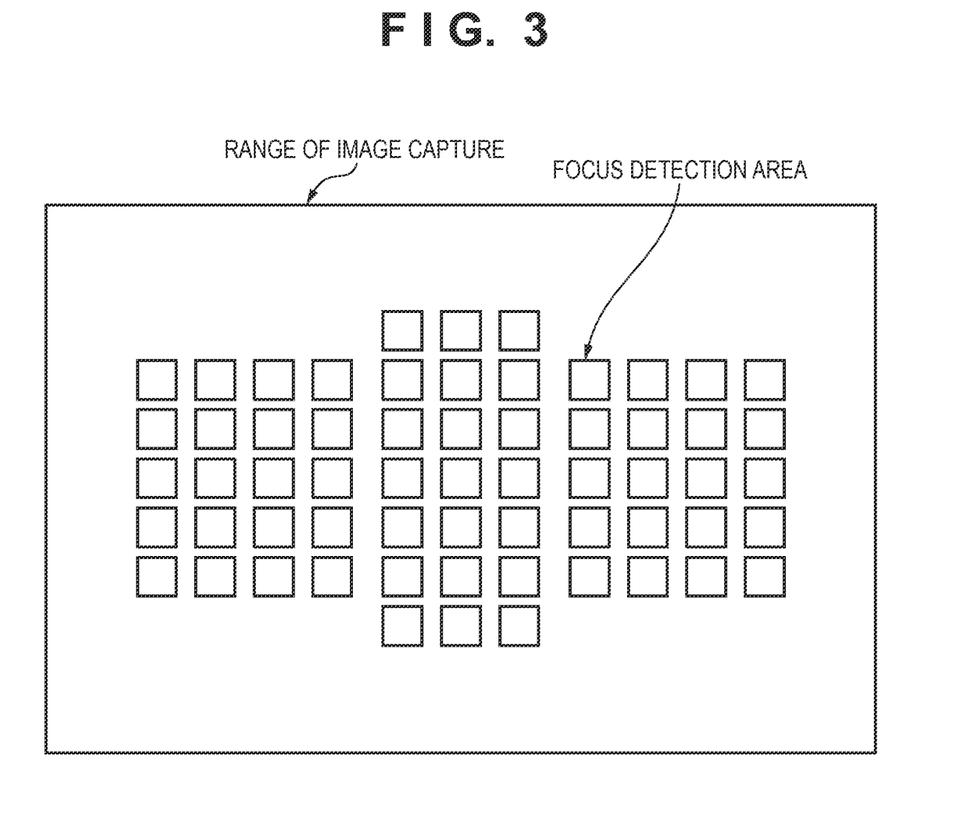
FIG. 3 shows an example of arrangement of focus detection areas in a digital single-lens reflex camera according to an embodiment of the present invention.

The AF device 205 is an AF sensor that uses a phase difference detection method. The AF device 205 detects a defocus amount and a focus direction of the imaging lens 202 by forming a secondary imaging surface of the imaging lens 202 above focus line sensors included in the AF device 205, and performs automatic focus adjustment by driving the focusing lens 213 based on the result of the detection. As focus control using a phase difference detection method is commonly known and is not directly related to the present invention, a description of a specific configuration and focus control of the AF device 205 is omitted. Note that the AF device 205 according to the present embodiment includes a plurality of focus detection areas shown in FIG. 3.

A focusing screen 206 is a transmissive liquid crystal display that serves as the viewfinder optical system and that is positioned on an expected imaging surface of the imaging lens 202. The focusing screen 206 superimposes information of focus detection areas and the like over an optical image of a field of view formed by the imaging lens 202. A user can check a field of view to be captured and focus detection areas by looking at the focusing screen 206 via a pentaprism 207 for diverting an optical path of a viewfinder through an eyepiece 209.

The AE device 208 converts an optical viewfinder image into auxiliary image data using an AE sensor including a plurality of pixels to observe the brightness of a subject. The AE sensor may be configured in a manner similar to an image sensor 211 except for the number of pixels. The AE sensor is called so because it is used mainly to detect the luminance of a subject. The AE device 208 performs brightness detection and exposure calculation for a subject using the generated auxiliary image data. In the present embodiment, a photometric sensor observes a region shown in FIG. 3 as a range of image capture, and the dynamic range for a low-illuminance subject can be increased by adding as many items of auxiliary image data as necessary.

In the present embodiment, a process for detecting the face of a subject is executed using the auxiliary image data. Note that the process for detecting the face may be executed using images captured by the image sensor 211 while taking a video (while taking a video to be recorded and while taking a video to be displayed as live view) and in an image capturing apparatus that does not include the AE sensor.

The image sensor 211 is, for example, a CMOS image sensor or a CCD image sensor. A plurality of pixels having a photoelectric conversion element are arranged in the image sensor 211. By opening a focal-plane shutter 210 with the main mirror 203 and the sub-mirror 204 retracted from an optical path for image capture, the image sensor 211 is exposed, and an optical image of a subject is captured.

Note that in the present description, image capture performed by the image sensor 211 is referred to as main image capture, whereas image capture performed by the AE sensor in the AE device 208 is referred to as auxiliary image capture. Also, an image generated through main image capture is referred to as a main image, whereas an image generated through auxiliary image capture is referred to as an auxiliary image.

A display 212 is, for example, a liquid crystal display (LCD). The display 212 is used as an electronic view finder that displays live-view images, and is used to display various types of set values, image capture information, apparatus information, a GUI screen, captured images, and the like.

Figure 2:
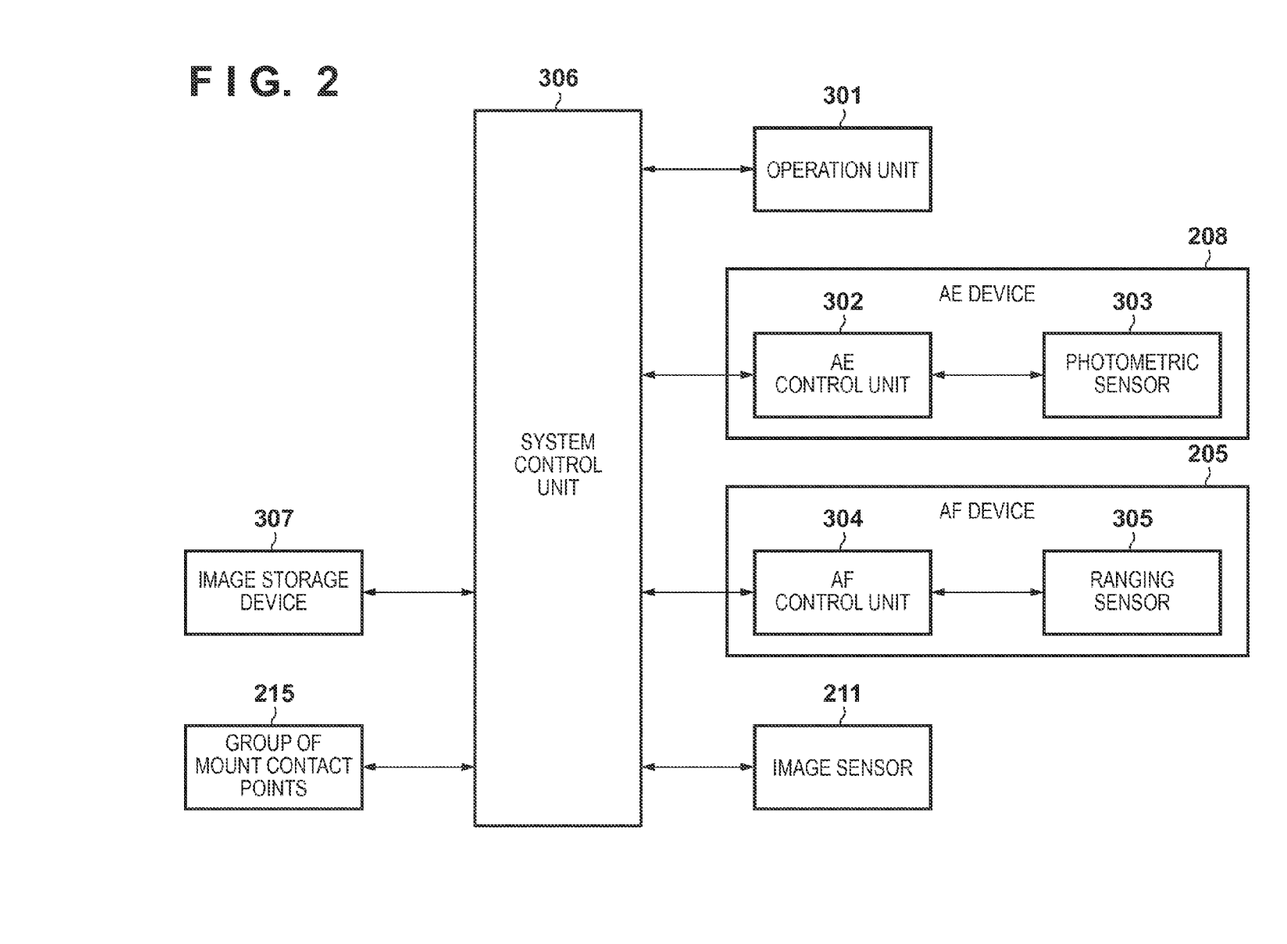
FIG. 2 is a block diagram showing an example of a functional configuration of a digital single-lens reflex camera according to an embodiment of the present invention.

FIG. 2 is a block diagram showing an example of a functional configuration of the DSLR according to the present embodiment. Note that in FIG. 2, the constituent elements that are the same as FIG. 1 are given the same reference signs thereas.

An operation unit 301 detects the operations performed by a user via buttons, switches and dials mounted on the main body 201 and the imaging lens 202 and via apparatuses connected to the main body 201 and the imaging lens 202, and outputs signals corresponding to the operations to a system control unit 306. The operation unit 301 transmits an SW1 signal or an SW2 signal depending on the extent to which a release button is pressed down. More specifically, the operation unit 301 outputs the SW1 signal and the SW2 signal to the system control unit 306 respectively when the release button is pressed about halfway down and when the release button is further pressed down to a predetermined extent. Note that the state in which the release button is pressed down to the extent that the SW1 signal is output is referred to as "pressed halfway down", whereas the state in which the release button is pressed down to the extent that the SW2 signal is output is referred to as "pressed all the way down". Also, the state in which the release button is being pressed halfway down is referred to as "SW1 hold state", whereas the state in which the release button is being pressed all the way down is referred to as "SW2 hold state". Furthermore, the operation unit 301 outputs an SW1 cancellation signal and an SW2 cancellation signal to the system control unit 306 respectively when the release button is not pressed down to the extent that the SW1 signal is transmitted and when the release button is not pressed down to the extent that the SW2 signal is transmitted.

As has been described above, the AF device 205 performs autofocus using the phase difference detection method, and drives the focusing lens 213 to a focus position (automatic focus adjustment) based on the result of the focus. The AF device 205 includes an AF control unit 304 and a ranging sensor 305. The ranging sensor 305 is constituted by, for example, line sensors corresponding to the arrangement of 61 focus detection areas shown in FIG. 3, converts light incident via the sub-mirror 204 into an electrical signal, and outputs a pair of image signals for each focus detection area to the AF control unit 304. The AF control unit 304 calculates a defocus amount of each focus detection area shown in FIG. 3 based on a phase difference between the pair of image signals output from the ranging sensor 305, and selects one focus detection area to be focused on. The AF control unit 304 then outputs a defocus map showing data of the defocus amount of each focus detection area, together with position information of the selected focus detection area, to the system control unit 306. The system control unit 306 performs focus adjustment calculation based on the position of the selected focus detection area and the defocus map, and controls the position of the focusing lens 213 to focus on the selected focus detection area.

The AE device 208 performs automatic exposure calculation and subject tracking. The AE device 208 includes an AE control unit 302 and a photometric sensor 303. The AE control unit 302 performs automatic exposure calculation based on the auxiliary image data read from the photometric sensor 303, and outputs the result of automatic exposure calculation to the system control unit 306. The system control unit 306 controls the value of the diaphragm 214 (the size of the aperture) based on the result of automatic exposure calculation output from the AE control unit 302 so as to adjust the amount of light incident on the main body 201.

During the SW1 hold state and continuous shooting, the AE control unit 302 detects the subject and tracks the detected subject using pieces of auxiliary image data sequentially obtained from the photometric sensor 303, and outputs the position information of the subject to the system control unit 306. The system control unit 306 outputs the position information of the subject output from the AE control unit 302 to the AF control unit 304.

The AF control unit 304 calculates a defocus amount of a focus detection area at, or in the vicinity of, the position of the subject output from the system control unit 306, and compares the result of calculation with a threshold that has been set in advance. When the result of comparison shows that the defocus amount is equal to or smaller than the threshold, the AF control unit 304 updates data of the position of the selected focus detection area to be output to the system control unit 306 from the focus detection area that the AF control unit 304 has selected based on the defocus amount of each focus detection area to a focus detection area at, or in the vicinity of, the subject.

When the operation unit 301 outputs the SW2 signal, the system control unit 306 retracts the main mirror 203 (and the sub-mirror 204) from the optical path by flipping up the main mirror 203 (and the sub-mirror 204). The system control unit 306 then drives the focal-plane shutter 210 to make the image sensor 211 exposed for a time period based on the result of automatic exposure calculation. Upon expiration of the exposure time period, the system control unit 306 flips down the main mirror 203 (and the sub-mirror 204).

The image sensor 211 generates image data by converting light incident via the imaging lens 202 during the exposure time period into electrical signals in pixels, and outputs the generated image data to the system control unit 306. The system control unit 306 applies predetermined image processing and the like to the image data output from the image sensor 211 so as to display the image data on the display 212 and write the image data to an image storage device 307.

A description is now given of the operations of the DSLR according to the present embodiment.

Figure 4A:
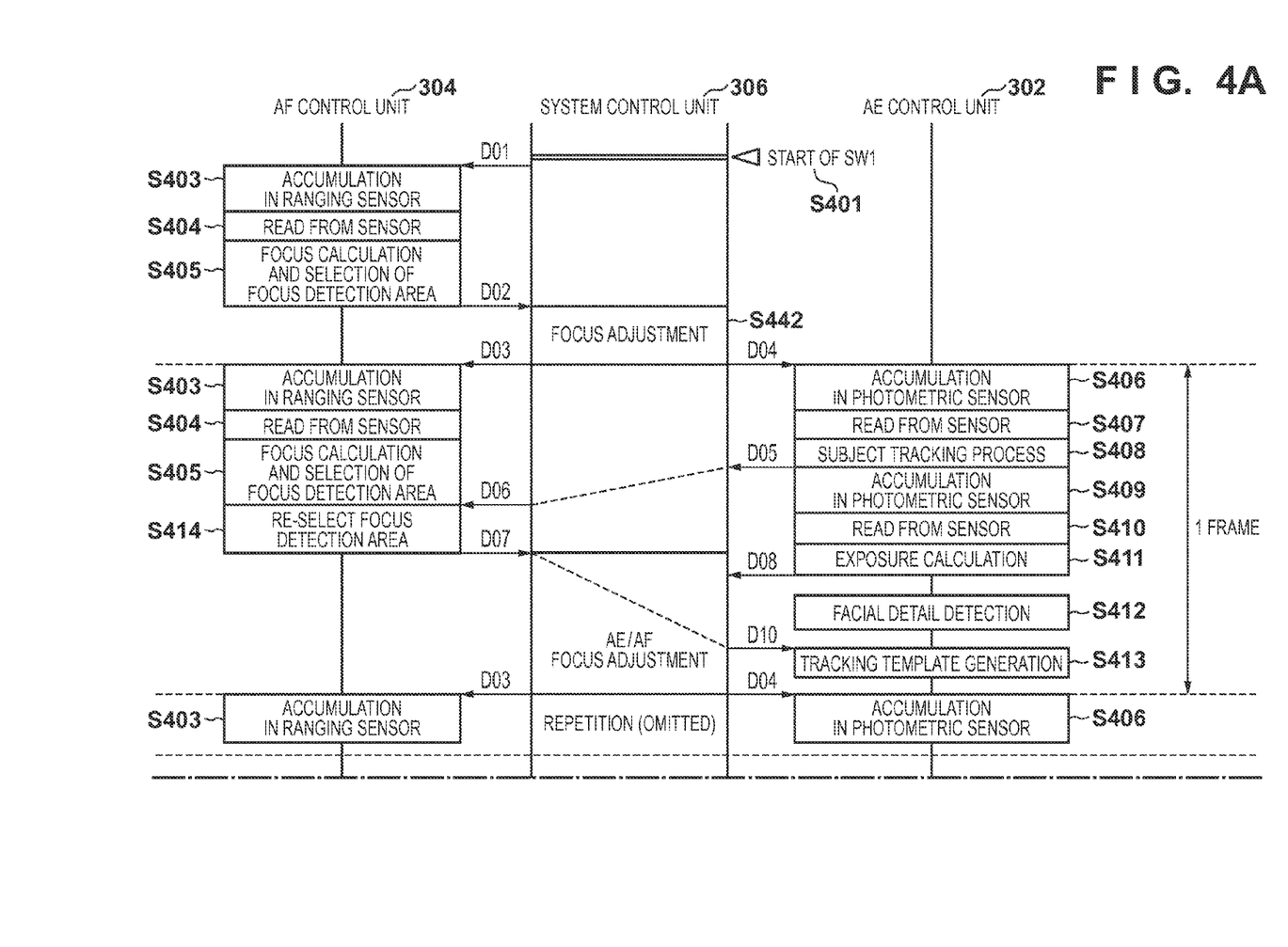
FIGS. 4A and 4B show procedures for processes executed by an AF control unit, a system control unit and an AE control unit shown in FIG. 2 and a correspondence relationship thereamong.
Figure 4B:
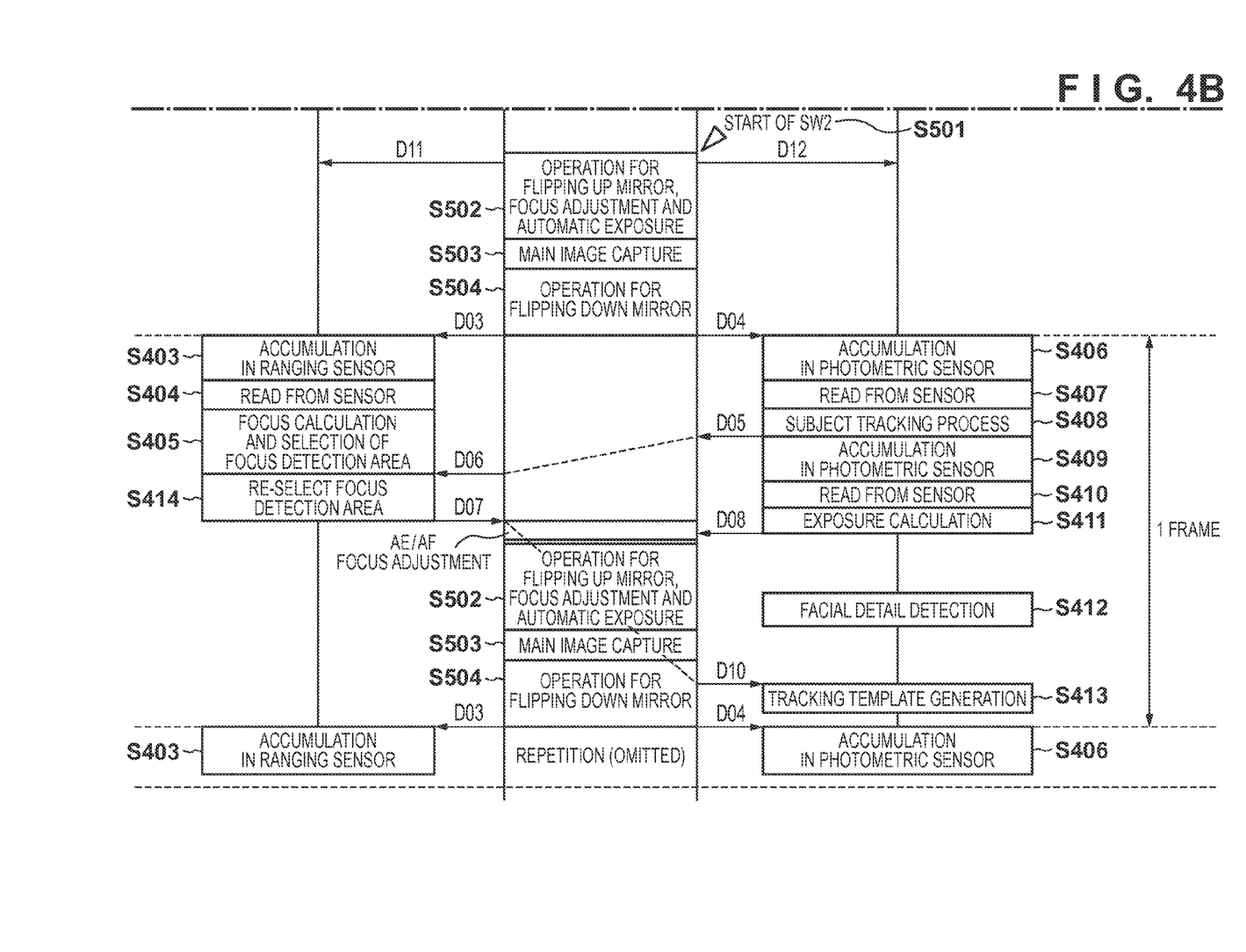

FIGS. 4A and 4B show an operational sequence for the AF control unit 304, the system control unit 306 and the AE control unit 302. Note that the first half of the operational sequence pertains to the SW1 hold state, and the second half of the operational sequence pertains to the SW2 hold state. The purpose of FIGS. 4A and 4B is to illustrate the procedures for processes and the timings of operations executed by the control units. There is no association between the size (height) of each process block and the length of its process time period. This applies to both processes executed by different control units and processes executed by the same control unit.

S401 shows a timing when the release button is pressed halfway down and the operation unit 301 outputs the SW1 signal to the system control unit 306. Upon receiving the SW1 signal as input, the system control unit 306 outputs an AF start signal DO1 to the AF control unit 304. The AF control unit 304 accordingly starts its operations.

In S403, the AF control unit 304 causes the ranging sensor 305 to perform accumulation.

In S404, the AF control unit 304 reads image signals from the ranging sensor 305.

In S405, the AF control unit 304 performs focus calculation for a focus detection area that has been arbitrarily selected by the user based on the read image signals. Alternatively, the AF control unit 304 obtains items of distance information of the subject with respect to a plurality of focus detection areas based on the read image signals, and performs focus calculation with a selection of a focus detection area for which the calculated distance information shows the shortest distance. The AF control unit 304 outputs a focus calculation result signal D02 including the defocus map and the position information of the selected focus detection area to the system control unit 306.

In S442, the system control unit 306 performs focus adjustment by driving the focusing lens 213 to focus on the selected focus detection area based on the focus calculation result signal D02. Upon completion of the focus adjustment, the system control unit 306 outputs an AF start signal D03 and an AE start signal D04 to the AF control unit 304 and the AE control unit 302, respectively.

Upon receiving the AE start signal D04, the AE control unit 302 causes the photometric sensor 303 to perform auxiliary image capture in S406. As the auxiliary image capture is started at the same time as accumulation in the ranging sensor 305 in the AF control unit 304 that has received the AF start signal D03, the image signals obtained by the ranging sensor 305 and the photometric sensor 303 are captured at the same timing.

The photometric sensor 303 obtains an auxiliary image by performing image capture twice with the exposure (charge accumulation) time period divided into two sections. The AE control unit 302 uses an image obtained by the first image capture to track the subject by way of template matching using a template image that has been stored in advance. The AE control unit 302 generates the auxiliary image corresponding to the original exposure time period by adding the image obtained by the first image capture and an image obtained by the second image capture, and performs exposure calculation based on the auxiliary image. As set forth above, the auxiliary image is obtained by performing image capture twice, and the subject tracking process is started using the image obtained by the first image capture. In this way, the subject tracking process can be started and the result can be obtained earlier than when the auxiliary image is obtained by performing image capture once. The related processes are described below in more detail.

In S407, the AE control unit 302 reads image data that was obtained by the photometric sensor 303 performing the first image capture in S406, and generates image data including a luminance signal and a color difference signal.

In S408, the AE control unit 302 performs the subject tracking process. The AE control unit 302 uses a template image that was generated in a tracking template generation process (S413) executed in the past as a track target image, and performs template matching using the track target image and the image data generated in S407. The AE control unit 302 then detects a position of a track target (the coordinates of the subject) in the generated image.

Specifics of this process will be described later. When the template image was generated in S413 based on the coordinates of the face obtained through a facial detail detection process in S412, the AE control unit 302 uses the coordinates of the subject detected by way of template matching as the coordinates of the face. Furthermore, the AE control unit 302 calculates the positions of the eyes in a face region currently being detected from information showing a difference between the coordinates of the face and the coordinates of the eyes that was calculated in S412 in the past, and outputs the coordinates of the face and the coordinates of the eyes to the system control unit 306 as a subject tracking result D05. On the other hand, when the template image was generated based on the position of the selected focus detection area, the AE control unit 302 outputs only the coordinates of the subject detected by way of template matching to the system control unit 306 as the subject tracking result D05.

That is to say, when the template image was generated based on the result of the facial detail detection process, information of the coordinates of the face and the coordinates of the eyes in a region of the track target detected by way of template matching can be obtained based on the result of the facial detail detection process used in generating the template image. As set forth above, in the present embodiment, each time the facial detail detection process is completed, a template image is generated based on the facial detail detection process, and a relationship between the coordinates of the face and the coordinates of the eyes is stored. Therefore, even with the use of template matching that enables high-speed processing, it is possible to obtain reliable information of the positions of the eyes and the face. This enables control to focus on the eyes and the face for each frame even while taking a video and during continuous shooting.

After the subject tracking result D5 is relayed by the system control unit 306, the AF control unit 304 is notified of the subject tracking result D5 as a subject tracking result D06. Note that when the template image has not been generated, the subject tracking process in S408 is skipped.

The AE control unit 302 causes the photometric sensor 303 to perform the second image capture in S409, and reads image data from the photometric sensor 303 in S410. Then, in S411, the AE control unit 302 generates an auxiliary image by adding the image data obtained by the first image capture and the image data obtained by the second image capture, and performs exposure calculation based on the auxiliary image. The result of exposure calculation is output to the system control unit 306 as an exposure calculation result D08. The system control unit 306 determines a diaphragm value and a shutter speed based on the exposure calculation result D08 and controls the diaphragm 214.

Meanwhile, when the AF control unit 304 receives the AF start signal D03 that is output from the system control unit 306 at the same time as the AE start signal D4, the AF control unit 304 executes the processes of S403 to S405 described above.

In S414, the AF control unit 304 receives the subject tracking result D06 via the system control unit 306. When the subject tracking result D06 includes the positions of the face and the eyes, the AF control unit 304 selects a focus detection area at, or in the vicinity of, the positions of the eyes. When the subject tracking result D06 does not include the positions of the eyes, or when there is no focus detection area at the positions of the eyes or in a predetermined range from the positions of the eyes, the AF control unit 304 searches for a focus detection area with respect to the position of the face in a similar manner. When the subject tracking result D06 does not include the positions of the eyes, the template image used in the subject tracking process is not generated based on the result of the facial detail detection process. When a focus detection area cannot be found at any of the positions of the eyes and the face, the AF control unit 304 uses the focus detection area selected in S405. The AF control unit 304 outputs a focus calculation result signal D07 including the defocus map and the position information of the selected focus detection area to the system control unit 306. The position information of the selected focus detection area may be information showing the specific position of the selected focus detection area. Alternatively, when information related to focus detection areas and their respective positions can be additionally used, the position information of the selected focus detection area may be information that can identify the selected focus detection area, such as a focus detection area number.

The system control unit 306 performs focus adjustment based on the position information of the selected focus detection area and the defocus map included in the focus calculation result signal D07. The system control unit 306 also determines whether or not the selected focus detection area has been changed based on the position information of the selected focus detection area included in the focus calculation result signal D07 and the previous position information of the selected focus detection area. The system control unit 306 sets a focus detection area re-selection flag to TRUE when the selected focus detection area has been changed (re-selected), and to FALSE when the selected focus detection area has not been changed (re-selected). The system control unit 306 notifies the AE control unit 302 of the position information of the selected focus detection area included in the focus calculation result signal D07 and the focus detection area re-selection flag as data D10.

In S412, the AE control unit 302 detects the details of the face and the eyes included in the image (the facial detail detection process). This detection may be performed using any known detection algorithm that is more accurate than template matching and can detect the eyes. As the details of this detection are not directly related to the present invention, a description thereof is omitted.

In summary, this detection is performed using detectors that have acquired knowledge in advance. A sufficient number of sample images including faces are prepared, and feature amounts are extracted from the sample images. For example, the Haar-like feature amounts obtained by using luminance differences, or the EOH feature amounts obtained by extracting edges, may be used as the feature amounts. Based on these feature amounts, the detectors acquire knowledge in advance with the use of a learning algorithm such as AdaBoost.

For example, when the Haar-like feature amounts are used, the AE control unit 302 obtains the position and the size of the face and the positions of the eyes in S412 by converting the auxiliary image into an integral image, calculating a difference in average luminances from blocks corresponding to the detectors, and multiplying the detectors by the calculated difference.

Figure 5:
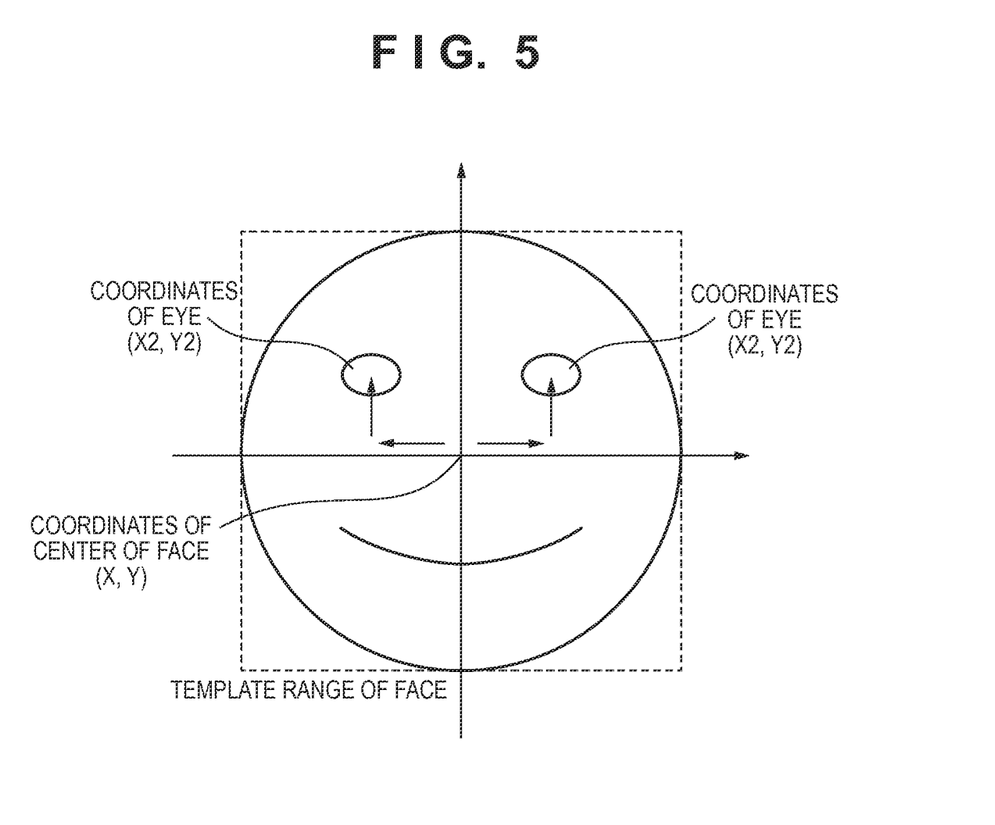
FIG. 5 shows a positional relationship between the face and the eyes obtained in a facial detail detection process and a template image in an embodiment of the present invention.

The size of the face, the coordinates of the center of the face, and the coordinates of the eyes in the coordinate system with the origin at the center of the face are stored in the AE control unit 302. FIG. 5 shows an example of a positional relationship between different sets of coordinates.

Note that the facial detail detection process executed in S412 takes time, and therefore is not executed on each frame while taking a video or during continuous shooting. When proceeding to the process of S412, should the facial detail detection process be continuing for a frame captured in the past, the AE control unit 302 does not perform facial detail detection for the current frame and proceeds to the next step.

In S413, the AE control unit 302 generates a tracking template based on the data D10 and the coordinates of the face detected in S412. When the face has been detected in S412, an image of the detected face is used as a template image. In this way, the result of the facial detail detection process executed in S412 is used to track the subject in the next frame. FIG. 5 shows an example of a relationship between a face region and a template image. When the face has not been detected in the facial detail detection process, the AE control unit 302 uses a predetermined range with the center at the coordinates notified through the data D10 as a template image. Specifics of this process will be described later.

By repeating the above processes of S403 to S414 (the processes executed after the focus adjustment process of S442 is completed) for each video frame or for each still image frame obtained by continuous shooting, the camera can execute AF control, AE control and the subject tracking process on each frame.

When the output of the SW2 signal is started in S501, the system control unit 306 starts a main image capture process after the exposure calculation of S411 is completed in the repetition of processes. More specifically, in S502, the system control unit 306 retracts the main mirror 203 (and the sub-mirror 204) from the optical path by flipping up the main mirror 203 (and the sub-mirror 204). The system control unit 306 also drives the focusing lens 213 and controls the diaphragm 214 and the focal-plane shutter 210 in accordance with the exposure calculation result and the defocus amount of the selected focus detection area, which were obtained immediately before S502. The system control unit 306 then performs the main image capture in S503. Thereafter, the system control unit 306 flips down the main mirror 203 (and the sub-mirror 204) in S504.

Furthermore, when the output of the SW2 signal is started, the system control unit 306 outputs a release start signal D11 to the AF control unit 304 and a release start signal D12 to the AE control unit 302. Upon receiving the release start signals D11 and D12, the AF control unit 304 and the AE control unit 302 stop the processes they have been executing up until that time. If the SW2 signal has already been output when the operation of S504 for flipping down the mirrors is completed, the system control unit 306 outputs the AF start signal D03 to the AF control unit 304 and the AE start signal D04 to the AE control unit 302. Thereafter, the main image capture process is started for the second frame of the continuous shooting. For the second frame onward, the processes of S403 and S406 and the subsequent processes are executed.

Note that in parallel with the processes of S502 to S504, the AE control unit 302 performs facial detail detection of S412, and stores the detected face as a new template image in S413. In the above manner, the photometric sensor 303 obtains an auxiliary image by performing image capture twice also in the case of the main image capture. This makes it possible to reduce a process time period from when the release button is pressed all the way down, to when a focus detection area corresponding to the detected face and eyes is selected after identifying the position of the face in the subject tracking process.

Figure 6A:
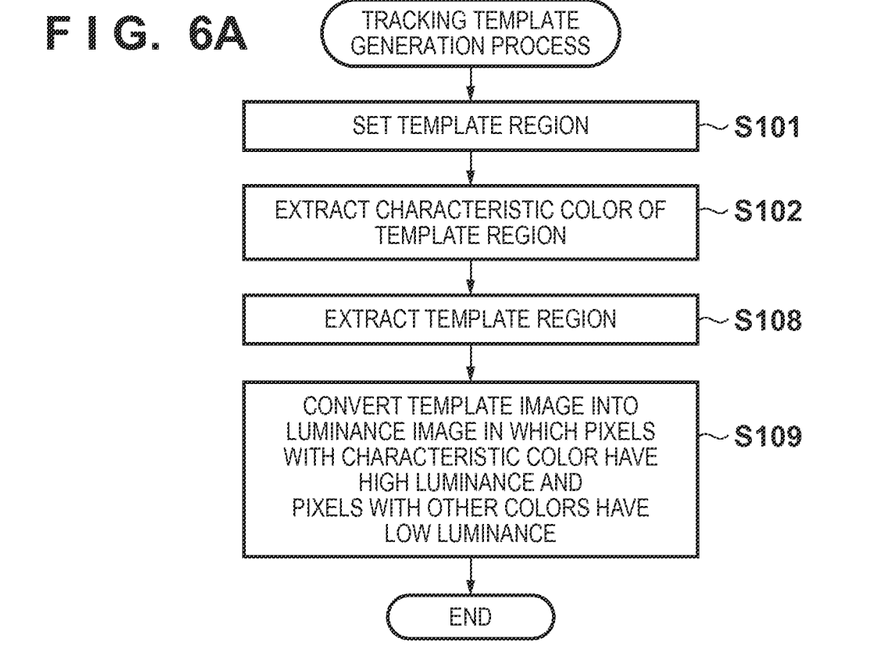
FIG. 6A is a flowchart of a template image generation process executed by a digital single-lens reflex camera according to an embodiment of the present invention.
Figure 6B:
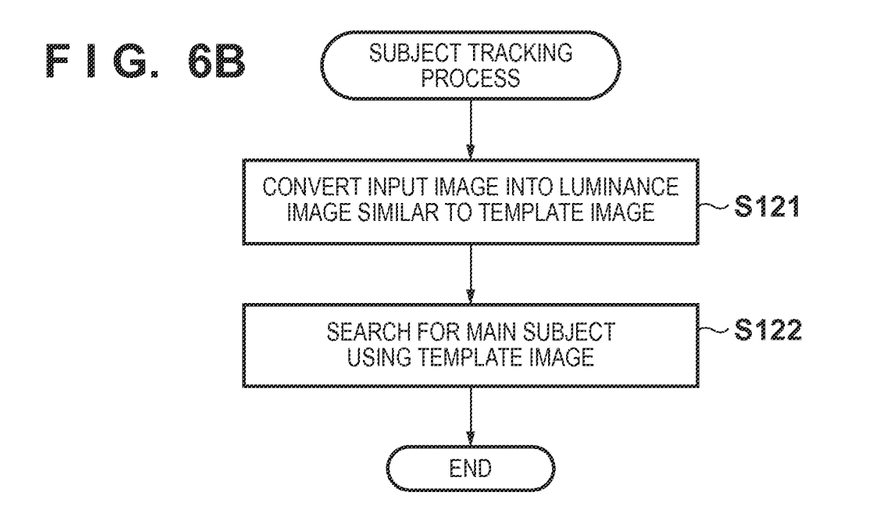
FIG. 6B is a flowchart of a procedure for a subject tracking process executed by a digital single-lens reflex camera according to an embodiment of the present invention.

The following describes the subject tracking process of S408 and the template image generation process of S413 with reference to the flowcharts of FIGS. 6A and 6B.

First, a description is given of the template image generation process of S413 with reference to FIG. 6A. FIG. 6A is a flowchart showing a procedure for the template generation process.

In S101, the AE control unit 302 determines a region to be extracted as a template from data of the image generated in S407 (the image obtained by the first image capture) based on the data D10. When the focus detection area re-selection flag is set to TRUE, the selected focus detection area is based on the result of detection in the subject tracking process of S408 that was executed immediately before S413. Therefore, the AE control unit 302 sets, as a template region, a region that has a predetermined size and shape with the center at the position obtained in the subject tracking process. On the other hand, when the focus detection area re-selection flag is set to FALSE, the AE control unit 302 sets, as a template region, a region that has a predetermined size and shape with the center at the position of the selected focus detection area included in the data D10.

The above branching process is executed because, when the result of the subject tracking process is not taken into consideration in the selection of the focus detection area, the corresponding image is not suitable as a template image used for tracking.

In S102, the AE control unit 302 calculates a color distribution of pixels in the template region, and detects a characteristic color of the track target. For example, the characteristic color may be detected as follows. First, an RGB histogram space is prepared in which the intensity of each of the R signal, G signal and B signal is categorized into 8 levels, that is to say, 0 to 7. This RGB histogram space includes 8×8×8=512 blocks (sets of coordinates). A color signal of each pixel in the template region is converted into data of RGB colors and is categorized into a corresponding block (coordinates) in the RGB histogram space based on the intensities of the R signal, G signal and B signal. This operation is performed for all the pixels in the template region, and a color (R, G or B) corresponding to a block that has the highest frequency of all the 512 blocks is used as the characteristic color of the track target.

In S108, the AE control unit 302 cuts out the template region from the image as a template image used in the tracking process.

In S109, the AE control unit 302 generates a luminance image by converting pixels in the template image that have the characteristic color into high-luminance pixels and converting pixels in the template image that have other colors into low-luminance pixels, and uses the generated luminance image as a final template image.

In the subject tracking process of S408, template matching is performed using this template image. In this way, template matching can be performed using the luminance image in which the characteristic color of the track target is emphasized, and therefore the calculation load can be reduced compared to the case where template matching is performed using a simple color image.

A description is now given of the subject tracking process of S408 with reference to FIG. 6B.

FIG. 6B is a flowchart of the subject tracking process.

In S121, the AE control unit 302 generates a luminance image from the color image data that was generated in S407 with the use of the photometric sensor 303, by converting pixels having the characteristic color extracted in the template generation process (S413) for the previous frame into high-luminance pixels and converting pixels having other colors into low-luminance pixels.

In S122, template matching is performed using the template image generated in the template generation process (S413) for the previous frame, and a region that has the highest correlation with the template image in the color-converted image is detected as a detection target.

The AE control unit 302 includes the position of the detected track target in the subject tracking result D5, and outputs the subject tracking result D5 to the system control unit 306. The system control unit 306 outputs the position of the track target to the AF control unit 304 as the subject tracking result D06.

In the focus detection area re-selection process S414, the AF control unit 304 searches for a focus detection area including the position of the track target notified through the subject tracking result D06, or a focus detection area in the vicinity thereof (within a predetermined range). When the applicable focus detection area has been found, a re-selection process is executed to use the applicable focus detection area as a new selected focus detection area.

As has been described above, in the present embodiment, when the facial detail detection process is completed that detects the face and the eyes at high accuracy and the feature amounts, a template image is generated based on the result of the facial detail detection process and used in the subject tracking process executed by way of template matching. This enables a high-speed subject tracking process using a highly reliable template image. Moreover, by storing the positions of the face and the eyes in the template image when generating the template image, information of the positions of the face and the eyes in an image region of the track target detected through template matching can be obtained. Therefore, high-speed template matching and autofocus control for the face and the eyes can both be realized.

Also, as the template image is updated each time the facial detail detection process is completed, the reliability of information related to the positions of the face and the eyes can be maintained.

Furthermore, as an image used for template matching is obtained by capturing that image in a time period shorter than the original time period for image capture, the timing for starting the subject tracking process can be advanced. Moreover, as template matching is performed using a luminance image in which the characteristic color of the template image is emphasized, the calculation amount required for template matching can be reduced.

Although an exemplary embodiment of the present invention has been described above, the present invention is not limited to the above embodiment, and various modifications and changes may be made within the scope of the concept of the present invention.

For example, the present invention can be similarly applied to autofocus control for characteristic parts of a subject other than the face and the eyes.

Furthermore, regarding a method for recognizing the position of a subject, the subject may be tracked using not only template matching but also color information. Alternatively, a dynamic object analysis using the optical flow or a scene recognition technique based on edge detection may be used.

Also, the feature amounts used in a face detection method are not limited to the Haar-like feature amounts obtained by using luminance differences in an image, but may be selected as appropriate from among the EOH feature amounts obtained by using the edge directions, the Edgelet feature amounts, and the like, depending on the characteristics of images captured by the image sensor and/or the purposes.

The above has described an exemplary configuration in which a process time period until the selection of a focus detection area corresponding to the face can be reduced because the photometric sensor 303 obtains an auxiliary image by performing image capture twice. Alternatively, the auxiliary image may be generated by performing the auxiliary image capture once. The present invention may adopt a configuration in which the positions of the eyes with respect to the position of the face are calculated through a tracking process by performing accumulation once for each frame, identifying the position of the face from the accumulated images through the tracking process, and using information of the positions of the eyes with respect to a face region detected by the facial detail detection.

Furthermore, the present invention is not limited to a configuration in which the tracking process and the facial detail detection process are executed using the images obtained by the photometric sensor 303. Alternatively, the present invention may adopt a configuration in which the tracking process and the facial detail detection process are executed for displayed images, such as live-view images, and for images obtained by the image sensor for generating images to be recorded.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-089674, filed on Apr. 10, 2012, which is hereby incorporated by reference herein its entirety.

What is claimed is:

1. An image capturing apparatus comprising:
   an image sensor;
   a first detection unit that, based on feature amounts of an image obtained by the image sensor, detects a position of a certain subject in the image and a position of a certain part of the certain subject;
   a second detection unit that detects a position of a region of the certain subject in the image obtained by the image sensor with a smaller calculation amount than the first detection unit;
   a selection unit that selects, from among a plurality of focus detection areas, a focus detection area to be focused on; and
   an autofocus unit that performs autofocus on the selected focus detection area,
   wherein the selection unit selects a focus detection area corresponding to the certain part based on a relationship between the position of the region of the certain subject detected by the second detection unit and the positions of the certain subject and the certain part detected by the first detection unit.

2. The image capturing apparatus according to claim 1, wherein the second detection unit detects the position of the region of the certain subject by way of template matching using a template image generated based on the position of the certain subject detected by the first detection unit.

3. The image capturing apparatus according to claim 2, further comprising a generation unit that generates the template image, wherein the generation unit generates the template image using the position of the certain subject when the position of the certain subject has been detected by the first detection unit, and generates the template image using a position of the focus detection area selected by the selection unit when the position of the certain subject has not been detected by the first detection unit.

4. The image capturing apparatus according to claim 3, wherein the second detection unit generates the template image by extracting a predetermined region based on the position of the certain subject detected by the first detection unit from the image obtained by the image sensor, detecting a characteristic color of pixels in the extracted predetermined region, and converting an image of the extracted predetermined region into a luminance image in which pixels corresponding to the characteristic color have higher luminance than pixels corresponding to other colors, and performs the template matching using the template image after converting the image obtained by the image sensor for detecting the position of the region of the certain subject into a luminance image similar to the template image.

5. The image capturing apparatus according to claim 1, wherein the certain subject is a face and the certain part is a pair of eyes.

6. A control method for an image capturing apparatus, the image capturing apparatus comprising:

an image sensor;

a first detection unit that, based on feature amounts of an image obtained by the image sensor, detects a position of a certain subject in the image and a position of a certain part of the certain subject; and a second detection unit that detects a position of a region of the certain subject in the image obtained by the image sensor with a smaller calculation amount than the first detection unit, and the control method comprising:

a selection step of selecting a focus detection area corresponding to the certain part from among a plurality of focus detection areas based on a relationship between the position of the region of the certain subject detected by the second detection unit and the positions of the certain subject and the certain part detected by the first detection unit; and an autofocus step of performing autofocus on the selected focus detection area.

* * * * *